J. D. SHORT.
SPRING WHEEL.
APPLICATION FILED OCT. 1, 1918.
1,387,077.
Patented Aug. 9, 1921.
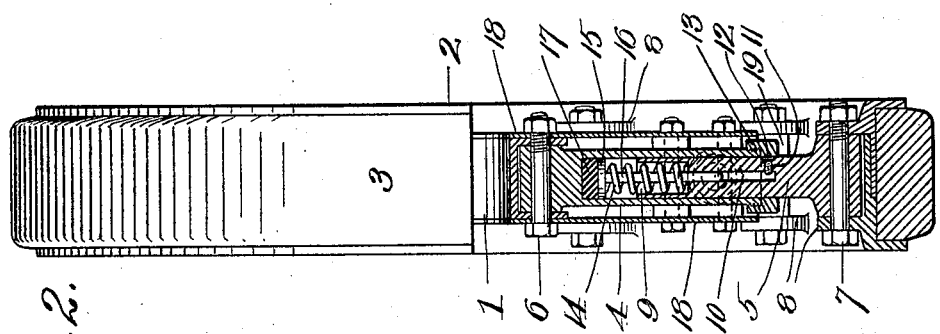
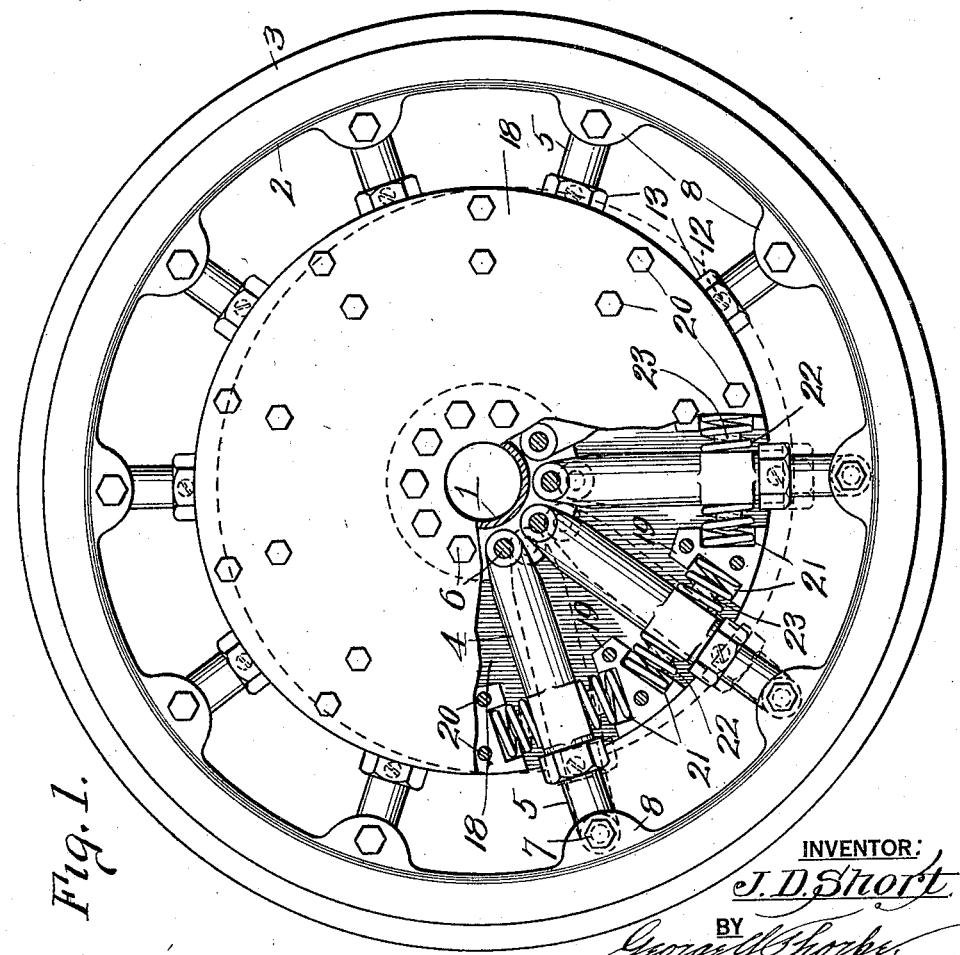
INVENTOR:
J. D. Short.
BY
George J. Thorpe.
ATTORNEY.

UNITED STATES PATENT OFFICE.

JEFFERSON D. SHORT, OF ALBUQUERQUE, NEW MEXICO.

SPRING-WHEEL.

1,387,077.  Specification of Letters Patent.  Patented Aug. 9, 1921.

Application filed October 1, 1918. Serial No. 256,392.

*To all whom it may concern:*

Be it known that I, JEFFERSON D. SHORT, a citizen of the United States, residing at Albuquerque, in the county of Bernalillo and State of New Mexico, have invented certain new and useful Improvements in Spring-Wheels, of which the following is a specification.

This invention relates to spring wheels for vehicles, and more especially to wheels for automobiles and the like, of that class of wheel comprising an inner member and an outer member connected by spring elongated telescopic spokes, the inner and outer ends respectively of the spokes, being pivoted to the inner member or hub and the outer member or rim of the wheel.

The object of the invention is to produce means for cushioning the shock and strain heavily imposed on the inner pivots of the spokes, incident to applying power to the axle to turn the wheel either forward or backward, and particularly from a stationary position, as at such time the inertia of the wheel and the load thereon must be overcome. A further object is to produce an efficient construction for accomplishing the cushioning function mentioned, which is simple, strong and durable.

With these objects in view the invention consists in certain novel and useful features of construction and combinations of parts as hereinafter described and claimed; and in order that it may be fully understood reference is to be had to the accompanying drawing, in which:

Figure 1, is a side view of a wheel embodying the invention, a part of the wheel being broken away to disclose features otherwise hidden.

Fig. 2, is an edge view showing the upper half of the wheel in elevation and the lower half of the wheel in central vertical section.

In the said drawing, 1 indicates the inner member or hub, and 2 the outer member or rim of the wheel. 3 indicates the tire which may be of solid rubber or the like or may be in the form of a pneumatic tire, not shown.

The inner and outer members are connected by telescopic spokes consisting of inner portions 4 and outer portions 5, the former being pivoted by bolts 6 to the inner member or hub, and portions 5, by bolts 7 to lugs 8 projecting from the rim near opposite margins thereof, and for convenience in placing the spokes in or removing them from position, the rim is preferably composed of two sections fitted together and secured in such relation by the bolts 7, as indicated by Fig. 2.

The members 5 which fit within members 4, are provided with sockets 9 in their inner ends and with longitudinal bores 10 extending outward from said sockets, and communicating with oil holes 11 closed by removable screw bolts 12 normally covered by nuts 13 screwed upon the outer ends of members 4 and forming dust proof connections between members 4 and 5. By unscrewing the nuts 13 and the screw bolts, oil may be easily and quickly supplied to the bores 10 of the spokes.

Fitting within the spokes are coiled expansive springs 14, the same bearing at their outer ends against the outer spoke members 5 and at their inner ends against the heads 15 of pins 16 fitting slidingly in bores 10 and extending through said springs, and interposed between the heads of said pins and the spoke members 4 near their pivotal points, are sound-deadening cushions 17 of rubber or the like.

With a construction of the character described it will be apparent that the weight of the car is transmitted through the axle to the inner portion of the wheel and is hence supported by the springs lying below the horizontal plane of the axle of the wheel, the production of noise or clicking as the springs come successively into action, being avoided by the interposition of the sound-deadening cushions 17 between the heads of the pins 16 and the closed or inner ends of the inner members of the spokes.

Rigid with the inner member is a pair of disks 18, the same being secured to said member or hub by the bolts constituting the pivots for the inner ends of the spokes, and to secure said disks in rigid relation at the peripheral edges and to perform an additional function hereinafter mentioned, blocks 19 are fitted between the disks and adjacent spokes and the disks are clamped rigidly to said blocks by bolts 20, it being noticed by reference to Fig. 1, that the blocks are spaced a considerable distance from the spokes and are provided in their opposite edges with recesses 21 for the reception of coiled expansive springs 22 engaging the spokes and tending to hold the same centralized between adjacent blocks, and to assist the said pockets constituted by said recesses 21 and the said disks, in holding the springs 22 in place, pins 23 project in opposite directions from the members or portions 4 of the spokes into said springs, it being noted by reference to Fig. 1, that the spokes are flattened at opposite sides to afford a wider bearing for the juxtaposed ends of the springs.

When the inner portion of the wheel is depressed as indicated by dotted lines in Fig. 1, the spokes have telescopic action. Those disposed vertically at the time have the greatest range of such action and those which may occupy a horizontal position, the shortest range of action. The inner member of the wheel of course moves vertically downward as distinguished from the pivotal movement of all of the spokes except those which may happen to stand in a vertical position, and as a result all of the springs 22 which happen to overlie their respectively engaged spokes, are compressed more or less according to their position, and such springs therefore coöperate with the inclosed springs 14, in the support of the inner member. The chief function of the springs 22, however, is to yieldingly resist the shock or jar incident to rotating the wheel under power applied upon its shaft or axle. It is obvious that as the power is applied at the point mentioned, the tendency is to swing all of the spokes out of their radial positions, their outer ends forming the axes of such movement, and in this action the spokes would, of course, be slightly elongated and until the spokes had been swung sufficiently to abut against each other at their inner ends, they would transmit no power tending to rotate the outer member. There must, of course, be a limit to this swinging movement of the spokes, and to limit the same in a practical manner and without shock or jar and undesirable noise, the springs 22 are provided, said springs being of such strength that they shall yieldingly but positively check the swinging movement of the spokes mentioned before the inner ends of the latter can come into contract, as will be readily understood by reference to Fig. 1, and in this connection it will be noticed that as the springs are provided at both sides of each spoke, a yielding resistance is provided regardless of the direction in which the wheel starts to turn.

The use of the springs 22 is also advantageous because it effects a more gradual starting of the car and thus avoids and minimizes the jerk to which the passengers of a car are frequently subjected, particularly when a car is started by an unskilled or careless driver.

From the above description it will be apparent that I have produced a spring wheel embodying the features of advantage enumerated as desirable in the statement of the object of the invention and which is susceptible of modification in minor particulars without departing from the principle of construction involved or the spirit and scope of the appended claim.

I claim:

A spring wheel, comprising an inner member, consisting of a pair of disks, blocks and radially arranged spokes alternating in a circular series between said disks, said blocks being bolted rigidly to the disks and the spokes pivoted to the latter at their inner ends, pins projecting from the spokes, expansive coiled springs fitted around said pins and engaging sockets in the adjacent blocks, a circular outer member surrounding the inner member, outer spoke members pivoted at their outer ends to said outer member and fitting telescopically in the first-named spokes, and expansive coiled springs within the inner spoke members and abutting at one end thereagainst and at their other ends against the outer spoke members.

In testimony whereof I affix my signature.

JEFFERSON D. SHORT.